United States Patent [19]

Jackson, Jr. et al.

[11] 4,350,805

[45] Sep. 21, 1982

[54] PROCESS FOR THE PREPARATION OF POLY(ESTER-CARBONATES)

[75] Inventors: Winston J. Jackson, Jr., Kingsport, Tenn.; William R. Darnell, Weber City, Va.

[73] Assignee: Eastman Kodak Company, Rochester, N.Y.

[21] Appl. No.: 207,817

[22] Filed: Nov. 17, 1980

[51] Int. Cl.³ ............................................ C08G 63/64
[52] U.S. Cl. ................................... 528/271; 528/176; 528/180; 528/181; 528/196; 528/200; 528/204
[58] Field of Search ................................ 528/271, 196

[56] References Cited

U.S. PATENT DOCUMENTS 3,335,111   8/1967   Pray et al. .......................... 528/196

FOREIGN PATENT DOCUMENTS 2435507   2/1976   Fed. Rep. of Germany ...... 528/271

*Primary Examiner*—Harold D. Anderson
*Attorney, Agent, or Firm*—William P. Heath, Jr.; Daniel B. Reece, III

[57] ABSTRACT

Process for preparation of poly(ester-carbonates) from aromatic diol bis(alkylcarbonates) and esters of dicarboxylic, and/or carboxylate-carbonate esters of hydroxy acids by suitably heating the reactants in the presence of a suitable polymerization catalyst.

5 Claims, No Drawings

PROCESS FOR THE PREPARATION OF POLY(ESTER-CARBONATES)

DESCRIPTION

1. Technical Field

This invention is a process for the preparation of poly(ester-carbonates). The process involves preparing the poly(ester-carbonates) from aromatic diol bis(alkylcarbonates) and esters of dicarboxylic acids and/or carboxylate-carbonate esters of hydroxy acids. The process comprises heating the above-mentioned reactants in the presence of a suitable polymerization catalyst.

2. Background Art

The prior art discusses the use of bis(arylcarbonates) of aromatic diols to prepare polycarbonates by reaction with aromatic diols because the bis(arylcarbonates) will give high polymers in the presence of a suitable catalyst whereas bis(alkylcarbonates) give only low molecular weight polycarbonates which are very brittle:

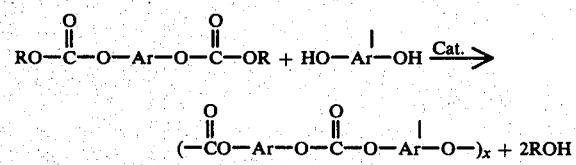

High polymer if R=aryl
Low polymer if R=alkyl or cycloaliphatic
When an aromatic diol (HO—Ar—OH above)

is not added and only the biscarbonate is used, the prior art (e.g. U.S. Pat. No. 3,335,111) recognizes the fact that polycarbonates can be obtained by the elimination of a diaryl carbonate (R=aryl below):

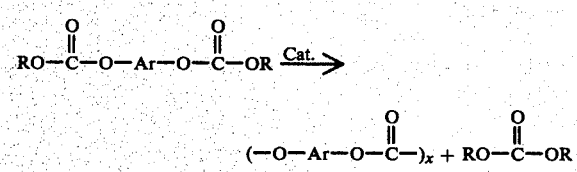

In contrast to the above chemistry, our new process involves the preparation of poly(ester-carbonates) with the elimination of a dialkyl carbonate in which one of the alkyl groups came from a carboxylic ester

as opposed to carbonate

above.

Disclosure of the Invention

Process for preparation of a high molecular weight poly(ester-carbonate) comprising (a) preparing a reaction mixture of (1) an aromatic diol bis(alkylcarbonate) (A) having the general formula

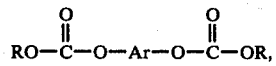

wherein R is the same or different and selected from alkyl groups containing 1-8 carbon atoms and Ar is the aromatic residue remaining after removal of hydroxyl groups from an aromatic diol, (2) 0 to 47-5 mole percent of at least one ester of at least one dicarboxylic acid (B) having the general formula

wherein R is the same or different and selected from alkyl groups containing 1-8 carbon atoms and Y is the residue remaining after removal of the carboxyl groups from an aliphatic, cycloaliphatic or aromatic dicarboxylic acid, (3) 0 to 80 mole percent of at least one mixed carboxylate-carbonate ester of at least one aromatic hydroxy acid (C) having the general formula

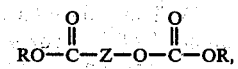

wherein R is the same or different and selected from alkyl groups containing 1-8 carbon atoms and Z is the residue remaining after removal of the hydroxyl and carboxyl groups from meta- or para-oriented aromatic hydroxy carboxylic acids, and (4) a catalytic amount of an ester exchange and polymerization catalyst, wherein the molar percentages of (A)+(B)+(C)=100%, the molar percentage of (A) is at least 5 percentile units greater than the molar percentage of (B); the molar percentage of (B) or the molar percentage of (C) may be 0, but the molar percentage of (B)+ the molar percentage of (C) is at least 5% of the total reactants, (b) heating the reaction mixture to a temperature sufficient to keep the reaction mixture molten and to distill away dialkyl carbonate condensation by-product, and (c) reducing pressure for a time sufficient to further remove dialkyl carbonate condensation product and to increase the molecular weight of the polymer.

The following equation illustrates the case when (A) is 1.0, (B) is 0.9 and (C) is 0. The poly(ester-carbonate) contains a low level of carbonate linkages (5 mole %) and no hydroxycarboxylic acid linkages:

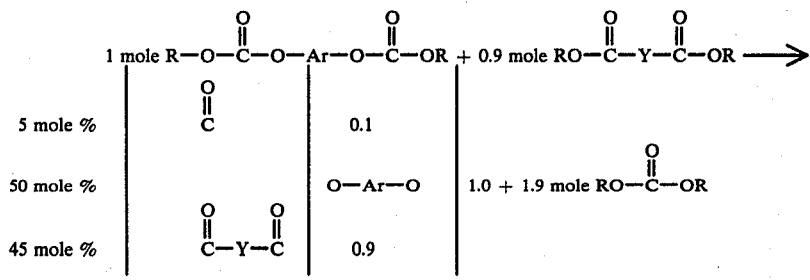

100 mole % total repeating units

A poly(ester-carbonate) containing a higher level of carbonate linkages may be prepared by decreasing the amount of dicarboxylic acid ester used in the process. For example, when (A)=1.0, (B)=0.10 and (C)=0, the mole % of carbonate in the poly(ester-carbonate) is 45% (based on all repeating units), and the polymer contains no hydroxycarboxylic acid linkages:

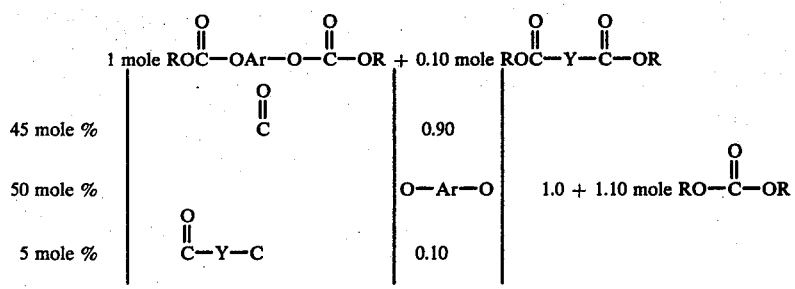

100 mole % total repeating units

The hydroxycarboxylic acid moiety is introduced into the poly(ester-carbonates) when (A) and (C)>0, (B)≧0 and (A)>(B). The poly(ester-carbonates) may contain up to 80 mole % of the hydroxycarboxylic acid moiety. For example, the poly(ester-carbonate) contains 60 mole % of the hydroxycarboxylic acid moiety and 10 mole % carbonate when (A)=0.2, (B)=0.1 and (C)=0.6:

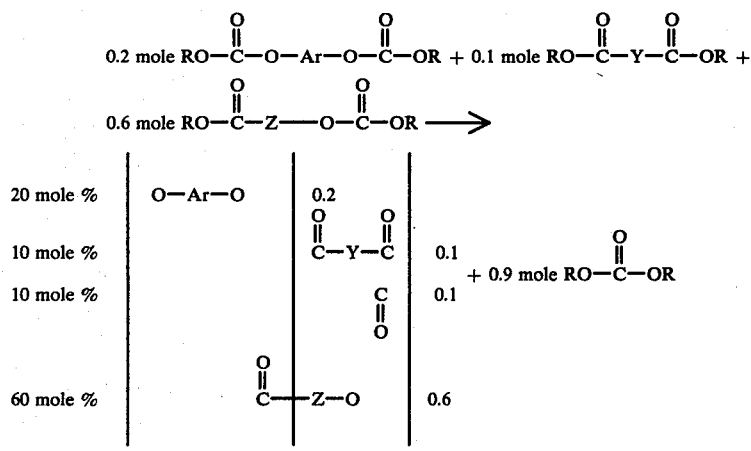

100 mole % total repeating units

The hydroxycarboxylic acid and carbonate moieties are varied in the poly(ester-carbonate) by varying the molar ratio of starting materials (A), (B) and (C). When less (C) is used relative to (A) plus (B), the poly(ester-carbonate) will contain less hydroxycarboxylic acid moiety and vice versa. When less (B) is used relative to (A), the carbonate content of the poly(ester-carbonate) will increase, and vice versa.

In the general structural formula for (A), Ar is the aromatic residue remaining after removal of the hydroxyl groups from an aromatic diol. It may be substituted with Cl atoms, alkyl groups containing 1–4 carbon atoms, and phenyl, and may contain fused rings. Examples of such aromatic diols are: 4,4'-(cyclohexylidene)-diphenol, 4,4'-(isopropylidene)diphenol, 4,4'-dihydroxybiphenyl, 2,6-naphthalenediol, 1,5-naphthalenediol, 1,4-naphthalenediol, hydroquinone, chlorohydroquinone, methylhydroquinone, t-butylhydroquinone, resorcinol, phenylhydroquinone, 4,4'-dihydroxydiphenylmethane, 4,4'-dihydroxydiphenylether, and 4,4'-dihydroxydiphenylsulfone. Other aromatic diols may be used in this invention so long as these diols and the polymers prepared therefrom have sufficient thermal stability to withstand the conditions of polymer preparation.

In the general structural formulae for (A), (B) and (C), the R's may be the same or different and are selected from alkyl groups containing 1–8 carbon atoms. Examples of such groups are methyl, ethyl, butyl, and 2-ethylhexyl. It is preferred that R be methyl groups.

In the general structural formula for (B), "Y" is the residue remaining after removal of the carboxyl groups from an aliphatic, cycloaliphatic, or aromatic dicarboxylic acid. Examples of such acids are azelaic, sebacic, dodecanedioic, dimerized fatty acids (such as dimer acid), cyclohexanedicarboxylic, terephthalic, isophthalic, and naphthalenedicarboxylic acids.

In the general structural formula for (C), "Z" is the residue remaining after removal of the hydroxyl and carboxyl groups from a meta- or para-oriented aromatic hydroxy carboxylic acid. Examples of such hydroxy carboxylic acids are p-hydroxybenzoic acid, m-hydroxybenzoic acid, and 2-hydroxy-6-naphthoic acid.

Catalysts which may be used in the process of the invention include compounds of titanium, tin, lead, or alkaline earth metals used in combination with antimony or germanium. Titanium catalysts are preferred, such as tetraisopropyltitanate (titanium tetraisopropoxide). The catalyst concentration may vary from about 10 parts per million to about 1000 parts per million metal based on the theoretical polymer yield, depending upon the catalyst specie and polymerization conditions used, but the preferred catalyst concentration is 50–250 ppm for the preferred catalyst, tetraisopropyltitanate.

The new process may be carried out at 200°–360° C. or more by conventional melt polymerization procedures. Generally, the process is begun by heating the intermediates and catalyst at ~280° C., and the reaction temperature is increased as required to keep the polymerization mixture molten and to distill away the dialkyl carbonate condensation by-product. Finally, vacuum is applied and the pressure is decreased during 15–30 minutes to 0.5 torr or less to attain a high molecular weight polymer. Generally, this step of the polymerization is carried out at 320°–360° C.

In some cases, the polymer melting point is high, and decomposition during extended heating periods in the melt is encountered. In these cases, a prepolymer may be prepared, comminuted, crystallized, and further polymerized in the solid state. The solid-state polymerization is preferably carried out above about 265° C., and at temperatures at least 10° C. below the melting point of the polymer.

Using the process as earlier described, one can prepare polymers having I.V.'s up to 0.9 or more, depending on the purity of reactants, the catalyst utilized, and the thermal stability of the polymers. In some cases, the polymers obtained will not be sufficiently soluble in the I.V. solvent to obtain an I.V. value. In these cases, films are pressed at 10°–20° C. above the melting point of the polymer, and the film toughness indicates that a high molecular weight polymer has been obtained.

The poly(ester-carbonates) prepared by the process of this invention have utility as molding plastics, fibers, films, adhesives, and coatings.

This invention will be further illustrated by the following examples although it will be understood that these examples are included merely for purposes of illustration and are not intended to limit the scope of the invention.

EXAMPLES

In the examples, the inherent viscosities of the polymers are determined (if sufficiently soluble) at 25° C. in a 40/36/24 weight mixture of p-chlorophenol/phenol/1,1,2,2-tetrachloroethane at a concentration of 0.1 g./100 mL. The melting points are determined with a Perkin-Elmer DSC-2 differential scanning calorimeter. Films are pressed in a Hannafin press at 10°–20° C. above the melting point of the respective polymers. The infrared spectra are obtained with a Perkin-Elmer Sodium Chloride Infrared Spectrophotometer, Model No. 137. The $^{13}C$ NMR spectra are obtained with a Brüker HX-90E carbon-13 NMR spectrometer, using a mixture of trifluoroacetic acid/d-chloroform as a solvent. Proton NMR analyses are carried out in a JEOL NMR Spectrometer, Model MH100.

1. This example illustrates the preparation of a poly(ester-carbonate) containing a high level (47.5 mole %) of carbonate moiety [(A)>>(B); (C)=0].

A mixture of 25.8 g. (0.075 mole) bisphenol A bis(methylcarbonate), 0.92 g. (0.00375 mole) dimethyl 2,6-naphthalenedicarboxylate, and titanium tetraisopropoxide (150 ppm Ti, based on the total weight of polymer being made) are placed in a flask equipped with metal stirrer and provision for maintaining a nitrogen atmosphere in the flask. Provision is also made for applying vacuum to the flask. After being purged with $N_2$ three times, the contents of the flask are vacuum dried at 110° C. for 30 minutes at 20 torr. The flask is immersed in a metal bath maintained at 280° C. and heated with stirring under nitrogen for 90 minutes. After three minutes heating, a low-boiling distillate is evident. The metal bath temperature is increased to 320° C. for 45 minutes. Vacuum is then applied to the flask, and the pressure is decreased to >0.5 torr during about five minutes. Thirty-five minutes after application of vacuum, the temperature of the metal bath is increased to 340° C., and the reaction mixture is stirred under vacuum for an additional 150 minutes. The resulting polymer is medium to high melt viscosity and has an I.V. of 0.52. A film pressed at 320° C. is tough, amber, and clear.

2. This example illustrates the preparation of a poly(ester-carbonate) containing a low level (2.5 mole %) of carbonate moiety and the use of a solid-state polymerization technique [(A)>(B); (C)=0].

A mixture of 22.6 g. (0.10 mole) hydroquinonebis(methylcarbonate), 18.43 g. (0.095 mole) dimethyl isophthalate, and titanium tetraisopropoxide (150 ppm Ti, based on the total amount of polymer being made) are placed in a flask equipped as described in Example 1. After being purged with nitrogen three times, the contents of the flask are vacuum dried for 30 minutes at 110° C. and 0.5 torr. The flask is immersed in a metal bath maintained at 280° C. and heated with stirring under nitrogen for 70 minutes. After three minutes heating, a low-boiling distillate is evident. The metal bath temperature is increased to 320° C. for 43 minutes and then to 360° C. for 20 minutes. At this time, vacuum is applied to the flask, and the pressure is reduced to 0.5 torr during 14 minutes. The polymerization is continued at reduced pressure for 12 minutes, during which time the polymer turns to a tan solid. After being cooled, the prepolymer is removed from the flask and ground through a 20 mesh screen. The prepolymer is insoluble in the I.V. solvent. An infrared spectrum indicates the prepolymer contains a small amount of carbonate. The 20 mesh particles of prepolymer are further polymerized in a glass tube at 340° C. for 6 hours at 0.1–0.2 torr. The light brown polymer is insoluble in the I.V. solvent, but a tough film is pressed at 400° C.

3. This example illustrates the preparation of a poly(ester-carbonate) containing the p-hydroxybenzoic acid moiety but no dicarboxylic acid moiety [(B)=0].

A mixture of 33.40 g. (0.10 mole) bisphenol A bis(methylcarbonate), 10.00 g. (0.05 mole) methyl p-(methoxycarbonyloxy)-benzoate and titanium tetraisopropoxide (150 ppm Ti, based on polymer being made) are placed in a flask equipped as described in Example 1. After being purged with nitrogen three times and vacuum dried at 100° C. for 30 minutes at 0.5 torr, the flask is immersed in a metal bath maintained at 280° C. and heated with stirring under nitrogen for 95 minutes. The metal bath temperature is then increased to 320° C. for 30 minutes and vacuum is applied. The pressure in the flask is decreased to 0.5 torr during 25 minutes and is continued for an additional 120 minutes. The amber, clear polymer has an I.V. of 0.55 and gives a tough film when pressed at 300° C. The mole % of the p-hydroxybenzoate moiety is determined to be 18 mole % by proton NMR.

4. This example illustrates the use of a tin catalyst instead of titanium catalyst in the process of the invention.

Example 1 is repeated, except dibutyltin diacetate (100 ppm Sn) is used as a catalyst. The polymer obtained has a high melt viscosity and an I.V. of 0.63. A film pressed at 320° C. is tough, amber, and clear.

5. This example illustrates the preparation by the process of the invention a poly(ester-carbonate) containing an aliphatic dicarboxylic acid moiety [(A)>(B); (C)=0].

A mixture of 17.2 g. (0.05 mole) bisphenol A bis(methylcarbonate), 3.45 g. (0.015 mole) dimethyl sebacate, and titanium tetraisopropoxide (150 ppm Ti, based on the total amount of polymer being made) are placed in a flask equipped as described in Example 1. After being purged with nitrogen three times, the contents of the flask are vacuum dried for 30 minutes at 100° C. and 0.5 torr. The flask is immersed in a metal bath maintained at 280° C. and heated with stirring under nitrogen for 85 minutes. After five minutes heating, a low-boiling distillate is observed. The metal bath temperature is increased to 300° C. for 55 minutes. At this time, vacuum is applied to the flask, and the pressure is reduced to 0.5 torr during 5 minutes. Ninety-five minutes after application of vacuum, the metal bath temperature is increased to 320° C., and the polymerization is continued for 135 minutes. The light amber polymer has an I.V. of 0.61, and a film pressed at 320° C. is tough and creasable.

The invention has been described in detail with particular reference to preferred embodiments thereof, but it will be understood that variations and modifications can be effected within the spirit and scope of the invention.

We claim:

1. Process for preparation of a high molecular weight poly(ester-carbonate) comprising
   (a) preparing a reaction mixture of
      (1) an aromatic diol bis(alkylcarbonate) (A) having the general formula

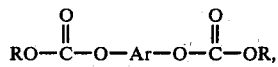

wherein R is the same or different and selected from alkyl groups containing 1–8 carbon atoms and Ar is the aromatic residue remaining after removal of hydroxyl groups from an aromatic diol,
      (2) 0 to 47.5 mole percent of at least one ester of at least one dicarboxylic acid (B) having the general formula

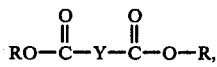

wherein R is the same or different and selected from alkyl groups containing 1–8 carbon atoms and Y is the residue remaining after removal of the carboxyl groups from an aliphatic, cycloaliphatic or aromatic dicarboxylic acid,
      (3) 0 to 80 mole percent of at least one mixed carboxylate-carbonate ester of at least one aromatic hydroxy acid (C) having the general formula

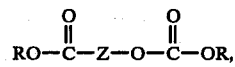

wherein R is the same or different and selected from alkyl groups containing 1–8 carbon atoms and Z is the residue remaining after removal of the hydroxyl and carboxyl groups from meta- or para-oriented aromatic hydroxy carboxylic acids, and
      (4) a catalytic amount of an ester exchange and polymerization catalyst,
   wherein the molar percentages of (A)+(B)+(C)=100%, the molar percentage of (A) is at least 5 percentile units greater than the molar percentage of (B); the molar percentage of (B) or the molar percentage of (C) may be 0, but the molar percentage of (B)+ the molar percentage of (C) is at least 5% of the total reactants,
   (b) heating the reaction mixture to a temperature sufficient to keep the reaction mixture molten and to distill away dialkyl carbonate condensation byproduct, and
   (c) reducing pressure for a time sufficient to further remove dialkyl carbonate condensation product and to increase the molecular weight of the polymer.

2. Process of claim 1 wherein said catalyst is selected from compounds of titanium, tin, lead, or alkaline earth compounds used in combination with antimony or germanium compounds.

3. Process of claim 2 wherein said catalyst is a titanium compound.

4. Process of claim 3 wherein said catalyst is tetraisopropyltitanate and the catalyst concentration is about 50 to 250 parts per million metal based on theoretical polymer yield.

5. Process of claim 1 wherein a prepolymer is prepared, comminuted, crystallized and further polymerized in the solid state at a temperature of about 265° C. or more but at least 10° C. below the melting point of the polymer.

* * * * *